United States Patent [19]

Finlay et al.

[11] Patent Number: 4,615,017
[45] Date of Patent: Sep. 30, 1986

[54] MEMORY CONTROLLER WITH SYNCHRONOUS OR ASYNCHRONOUS INTERFACE

[75] Inventors: David E. Finlay, Boulder; Kent S. Norgren; Frankie S. Shook, both of Longmont, all of Colo.

[73] Assignee: International Business Machines Corporation, Armonk, N.Y.

[21] Appl. No.: 533,397

[22] Filed: Sep. 19, 1983

[51] Int. Cl.[4] .......................................... G06F 13/00
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,848,233 | 11/1974 | Lotan et al. | 364/200 |
| 3,993,981 | 11/1976 | Cassarino, Jr. et al. | 364/200 |
| 3,999,163 | 12/1976 | Levy et al. | 364/200 |
| 4,007,448 | 2/1977 | Sergeant et al. | 364/200 |
| 4,151,593 | 4/1979 | Jenkins et al. | 364/200 |
| 4,300,194 | 11/1981 | Bradley et al. | 364/200 |
| 4,319,323 | 3/1982 | Ermolovich et al. | 364/200 |

OTHER PUBLICATIONS

IBM Tech. Discl. Bull., vol. 19, No. 10, "Common I/O and Storage Interface" by W. E. Tutt, Mar. 1977, pp. 3643-3647.

*Primary Examiner*—James D. Thomas
*Assistant Examiner*—William G. Niessen
*Attorney, Agent, or Firm*—Charles E. Rohrer

[57] ABSTRACT

A common memory interfacing circuit and method for coupling a memory to either a synchronous bus or an asynchronous bus. Synchronizing means are provided for synchronizing memory request signals with a local clock when the interfacing circuit is coupled to an asynchronous bus. The interface circuit responds to signals from the memory when internal memory operation has been completed and generates an acknowledge signal to send to the requesting bus. To simplify the common interface circuit, a synchronous protocol for information exchange between system components is made similar to an asynchronous protocol.

6 Claims, 11 Drawing Figures

MEMORY CONTROLLER WITH SYNCHRONOUS OR ASYNCHRONOUS INTERFACE

This invention relates to data processing systems and more particularly to a circuit and method which can be used to interface a memory with either a synchronous or an asynchronous bus.

BACKGROUND OF THE INVENTION

In the design of data processing systems, the designer must choose to make the entire system synchronous, asynchronous, or have a synchronous bus portion and an asynchronous or bus portion. Most systems are made synchronous whereby every component in the system operates from a single clock or system of integrated clocks. The major advantage of a synchronous configuration is that the various components in the system can query and respond to each other in a high speed, high performance fashion.

In asynchronous bus architecture, the various components in the data processing system each operate with their own local clock, not necessarily synchronized to any other clock in the system. In these configurations, some components, too slow or too fast to operate in a synchronous system, can be used. In general, the major advantage of an asynchronous bus system is the flexibility in the number and kind of components that can be placed into the system. However, such systems incur a time penalty since the interchange of information between components involves a delay in acting upon the received information by the receiving component until the received information signals are synchronized to the local clock.

Even though synchronous and asynchronous systems are different in concept and use, the inventors herein observed that the difference between the two systems in terms of memory controller circuits can be made small. In the case of an asynchronous system, controller interface circuits are needed to synchronize the received signals to the internal local clock whereas in the synchronous case, the received signals are already synchronous with the clock. In each case, however, once the data is synchronized to the local clock, the rest of the operations are essentially the same. From this observation, the inventors herein have developed a memory controller with interface circuits that can be used for the highly flexible asynchronous case and can also be used in a high performance synchronous network if desired. Since the same memory controller can be used for both cases, a universal memory controller is provided thereby obviating the need for designing a multiplicity of memory controllers and avoiding the stocking of additional parts.

*IBM Technical Disclosure Bulletin*, March 1977, pages 3643 et seq. discloses a bus system which can address either a synchronous memory or an asynchronous memory. However, the controllers for each memory are different and therefore a universal memory controller is not described.

U.S. Pat. No. 3,999,163 discloses a system which is connected to several different memory devices, tapes, disks, etc., some of which are said to be synchronous and some of which are said to be asynchronous. The memory controller, however, is connected over only a synchronous bus to the CPU.

SUMMARY OF THE INVENTION

Briefly stated, this invention provides a universal memory controller for connecting a memory to a processor over either an asynchronous bus or a synchronous bus. By so doing, a universal dynamic random access memory can be used in either bus system and only a single controller need be designed, built and stored.

To implement the invention, a synchronous protocol for data transfer has been devised to resemble an asynchronous protocol. By so doing, a simple circuit with only a few components is added to the memory controller thereby enabling that controller to connect to either synchronous or asynchronous bus systems.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

DETAILED DESCRIPTION

Figure 1:
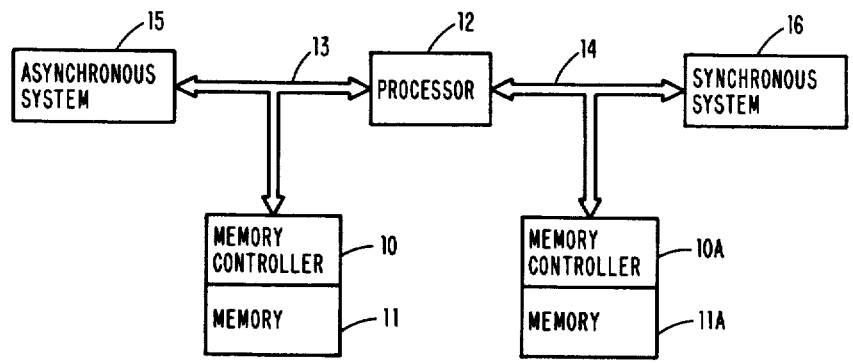
FIG. 1 is a block diagram of a data processing system configuration wherein the universal memory controller of the invention is used in a first memory connected to a synchronous bus and in a second memory connected to an asynchronous bus.

FIG. 1 illustrates a data processing system in which processor 12 is connected to an asynchronous bus 13 and to a synchronous bus 14. Memory controller 10 for memory 11 is connected to bus 13 and memory controller 10A with memory 11A are connected to synchronous bus 14. The two memory controllers 10 and 10A, when utilizing the interface circuits of the instant invention, are identical and therefore only a single memory card need be stocked for each of these components. If desired, other asynchronous components 15 can be attached to bus 13 and other synchronous components 16 can be attached to bus 14. These other components may also act as bus masters to gain access to the memory attached to its bus through the universal memory controller.

Figure 2:
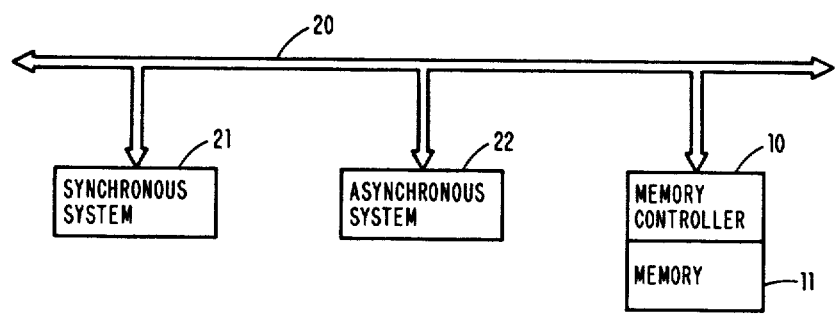
FIG. 2 shows another data processing system configuration utilizing the universal memory controller of the invention wherein the memory controller is connected to a single bus which can be operated in either synchronous or asynchronous mode.

FIG. 2 shows an alternate data processing system in which a single bus 20 can be operated in the synchronous mode when under the control of a synchronous system 21 and can be operated in an asynchronous mode when under control of the asynchronous system 22.

While not shown in FIG. 2, some kind of bus arbitrating system would be present to determine which of the two systems has control of the bus 20. If the bus 20 were operating in the synchronous mode, it would have access to the memory 11 through memory controller 10. If the asynchronous system 22 were in control of the bus, it would have access to the memory 11 through memory controller 10. The universal memory controller of the instant invention allows a few common circuits in the memory controller to handle both the synchronous and asynchronous input.

Figure 3:
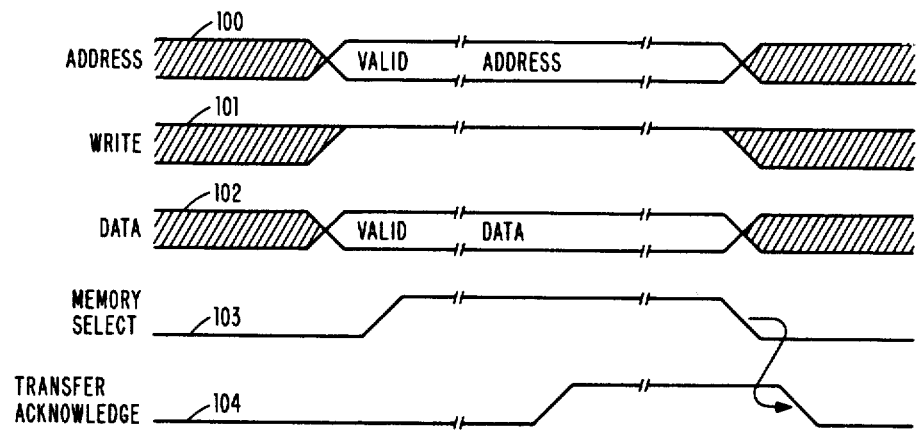
FIGS. 3 and 4 are timing diagrams that illustrate a common protocol for asynchronous data transfer used with the controller circuits of FIGS. 7 and 8.
Figure 4:
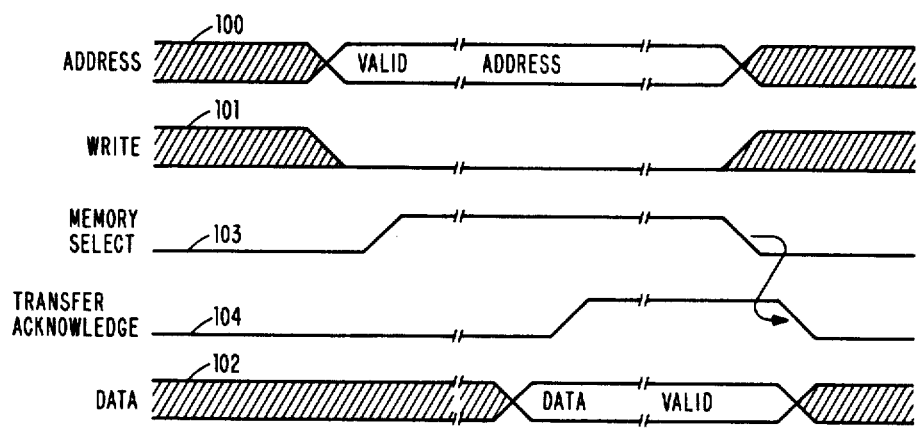

As mentioned above, in order to provide a simple implementation of a universal memory controller, a synchronous protocol for transferring information in the synchronous mode has been designed which is similar to a common type of asynchronous protocol. FIGS. 3 and 4 illustrate the asynchronous protocol used with the circuits shown in FIGS. 7 and 8.

FIG. 3 illustrates that when performing a write operation, the bus master raises Read/Write control signal 101 simultaneously with placing address and data signals on their respective buses. The Memory Select signal 103, however, is not raised until shortly after the address signals 100 and the data signals 102 are on their respective buses. The delay is used so that raising the Memory Select signal indicates that the address and data signals are valid. Since FIG. 3 illustrates an asynchronous system, the length of time for the memory controller to respond to the write request is indeterminate. (In an asynchronous system, the exact time of memory controller response is unknown.) However, when the memory controller has received the data, it issues a Transfer Acknowledge signal 104. When the processor receives the memory controller's Transfer Acknowledge signal, it deactivates its Memory Select signal 103 and removes the address and data from their respective buses. At the same time, it also deactivates the Read/Write control signal 101. As shown in FIG. 3, when the memory controller receives the deactivation of the Memory Select signal 103 it then deactivates its Transfer Acknowledge signal 104 thereby completing a write cycle.

FIG. 4 illustrates the asynchronous protocol for a read cycle. In this case, the address data 100 is placed on the address bus by the bus master and at the same time the Read/Write control signal 101 is not raised thereby indicating that a read operation is requested. The Memory Select signal 103 is activated shortly after the address data is placed on its bus to indicate that the address signals are valid. When the memory controller receives the Memory Select signal and the Read signal, it decodes the address and accesses the designated memory locations to place the required data signals 102 on the data bus. The memory controller then raises its Transfer Acknowledge signal 104 to indicate that the data on the data bus is valid. When the processor receives the Transfer Acknowledge signal, it then samples the data bus and deactivates the Memory Select signal 103. When the memory controller receives the deactivation of Memory Select signal 103, it then deactivates the Transfer Acknowledge signal 104 and removes the data signals 102 from the data bus thus completing the asynchronous read cycle.

Figure 5:
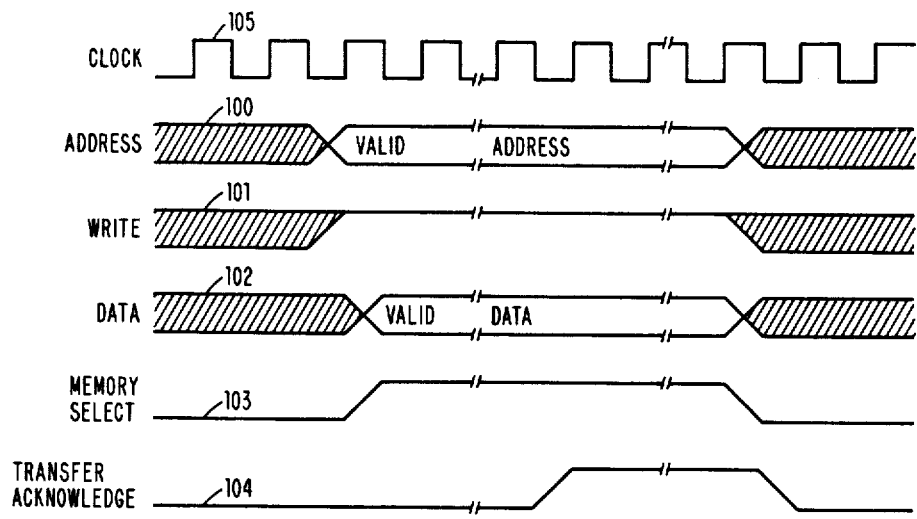
FIGS. 5 and 6 are timing diagrams that illustrate a synchronous protocol, purposely designed to be similar to the asynchronous protocol of FIGS. 3 and 4, for use with the controller circuits of FIGS. 7 and 8.
Figure 6:
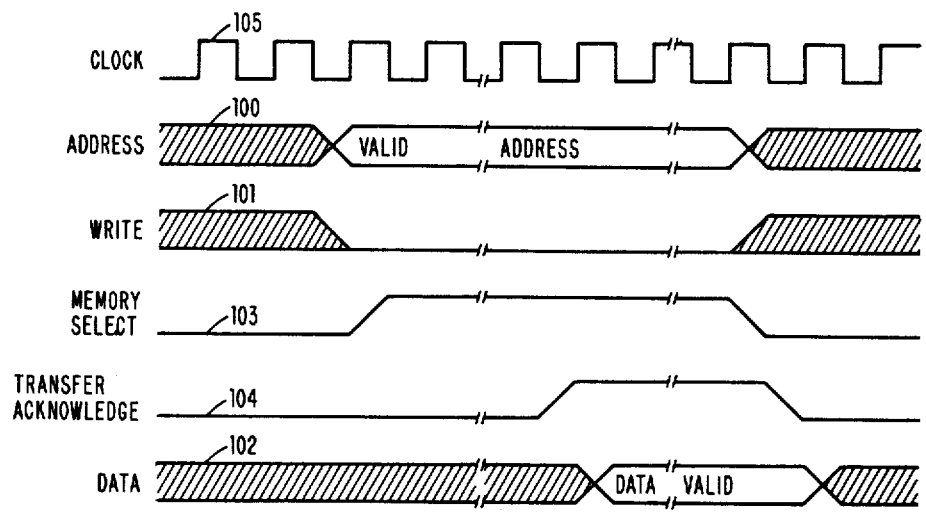

FIGS. 5 and 6 illustrate a synchronous protocol which is deliberately made similar to that of the asynchronous protocol described in FIGS. 3 and 4. In the synchronous case, a common clock signal 105 is present and is shown in each of FIGS. 5 and 6.

In FIG. 5, which shows the synchronous write cycle, the protocol requirement is that the bus master place its address information on the address bus and raise the Read/Write control signal 101 either prior to or concurrently with the leading edge of that clock signal which immediately precedes the raising of the Memory Select signal. Additionally, the bus master must place its data information on the data bus either prior to or concurrently with the trailing edge of the clock signal which immediately follows the raising of the Memory Select signal. The Memory Select signal must be raised on a leading edge of the clock signal so that it is valid by the subsequent trailing edge of the clock signal. The reason for the difference in the protocol requirement between the address signals and the data signals is that when synchronous read and write cycles are executed sequentially, superior efficiency can be achieved as will be more fully explained below.

FIG. 5 shows that the memory controller which has been addressed during this write cycle may respond at an indeterminate point in time. (While this is termed a synchronous system, not all events execute on specific clock cycles.) When it does respond, it raises the Transfer Acknowledge signal 104 to indicate that it has received the data. According to the bus protocol, Transfer Acknowledge must be raised on a trailing edge of the clock signal so that it is stable by the subsequent leading edge of the clock signal. Upon receipt of the Transfer Acknowledge signal 104, the bus master then deactivates the Memory Select signal 103 (again on a leading edge of the clock signal) and simultaneously deactivates the data, the address data, and the Read/Write control signals. Upon receiving the deactivation of Memory Select signal 103, the memory controller deactivates the Transfer Acknowledge signal 104 on a trailing edge of the clock signal thereby completing the synchronous write cycle.

The observation can be made from FIG. 5 that the time period for the memory controller to respond to the write request is indeterminate. In some synchronous systems, the clocking of all events is determined to occur on specific clock cycles. This restriction is not forced upon the synchronous system described in FIG. 5. However, the timing protocol of FIG. 5 (and FIG. 6) is synchronous in the sense that a common clock is used.

FIG. 6 illustrates the timing protocol for a synchronous read cycle. The bus master places address data 100 on the address bus and does not raise the Read/Write control signal 101 (thereby indicating a read operation). These events occur either prior to or concurrently with the leading edge of the clock signal which immediately precedes the raising of the Memory Select signal. The Memory Select signal 103 is raised on the leading edge of a clock signal so that it is stable by the subsequent trailing edge of the clock signal. When the memory controller receives the Memory Select signal, it decodes the address, performs the memory read operation, raises its Transfer Acknowledge signal 104 on a trailing edge of the clock signal and places data on the data bus so that it is valid by the subsequent trailing clock edge. This is slightly different from the asynchronous protocol. As explained above, in the asynchronous case the Transfer Acknowledge signal is not raised before data is placed on the data bus. In this case, however, when the memory controller receives the address and Memory Select signal along with the Read request, it raises the Transfer Acknowledge signal one-half clock cycle ahead of placing the data on the data bus. In that manner, the requesting bus master is alerted by the Transfer Acknowledge signal that the data it has requested will be present on the data bus and will be valid on the next trailing edge of the clock signal. In accordance with the bus protocol, the data may be sampled at that time by the requesting bus master. Thereafter, Memory Select signal 103 is deactivated on a leading edge of the clock signal together with the address signals. Upon receiving the deactivation of the Memory Select signal, the Transfer Acknowledge signal is deactivated on a trailing edge of the clock signal and the data is removed from the data bus completing the synchronous read cycle.

As mentioned above, superior efficiency can be achieved when synchronous read and write cycles are executed sequentially. Note in FIG. 6 that, in completing the read cycle, the address bus becomes available prior to the data bus. Note also, in FIG. 5, during the write cycle, address information is placed on the address bus prior to the time that data information is placed on the data bus. Since FIGS. 5 and 6 illustrate a synchronous system wherein the timings involved are predetermined, the bus master can use this protocol to begin the presentation of address data for the next write cycle while the data bus is still in use for the preceding read cycle. Such superior bus efficiency could not be accomplished in an asynchronous system.

To obtain added efficiency with the synchronous timing protocol shown in FIGS. 5 and 6, the requirements for timing the Memory Select signal are more constrained than in the asynchronous case. In the system shown, synchronous protocol requires that the Memory Select signal be raised or dropped on a rising transition of the clock and must be valid and stable by the next falling transition of the clock. In the same manner, the Transfer Acknowledge signal is raised or dropped on a trailing edge of the clock and must be valid by the next leading edge of the clock. (If desired, the clock edges used could be reversed.) In that manner, write and read cycles can be efficiently executed.

The essential point to observe, however, from FIGS. 3–6, is that a protocol for the synchronous case has been designed similar to that of the asynchronous case. By so doing, a few simple circuits as shown in FIGS. 7 and 8, can be used to provide a common interface for a memory controller that can handle information received over either a synchronous or an asynchronous bus.

Figure 7:
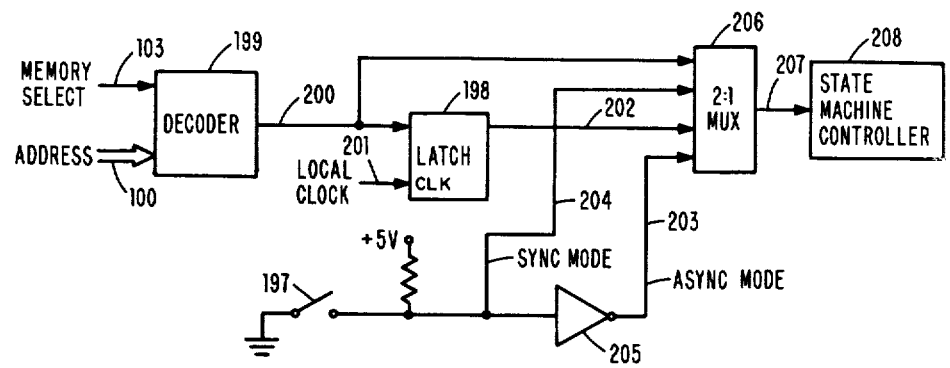
FIGS. 7, 7A, 8, and 8A are circuit diagrams that show an implementation of the interface circuitry for the universal controller of the instant invention.
Figure 8:
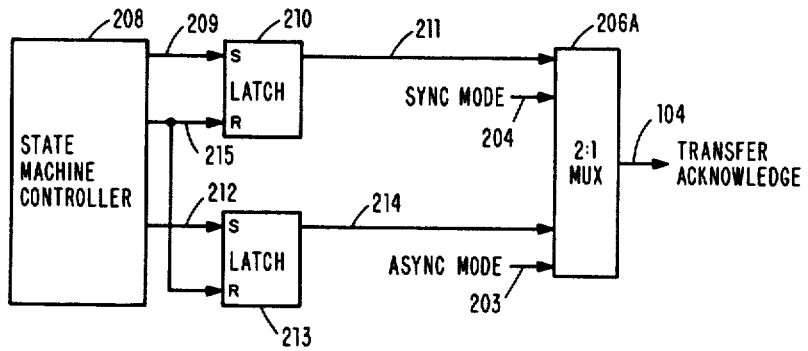

In FIG. 7, a Memory Access Request signal is raised on line 200 when a decoder 199 receives a Memory Select signal 103 and address signals 100 which indicate that the particular memory is being addressed. If the controller circuits are connected to a synchronous bus, a Synchronous Mode signal on line 204 is supplied to multiplexing logic circuit 206 to raise a signal on line 207 which indicates the memory access request to the state machine controller 208. In that manner, the state machine controller receives the memory access request which is already synchronized as specified by the bus protocol and it will thereafter perform its internal operation either to write data or to read data as required.

If, however, the circuit of FIG. 7 is connected to an asynchronous bus, the Memory Access Request signal on line 200 is not immediately passed through multiplexing logic circuit 206 since the Synchronous Mode signal is deactivated. In this case, the Memory Access Request signal on line 200 is first synchronized by latch 198 with a Local Clock signal on line 201 to provide an output signal on line 202. That signal passes through multiplexing logic circuit 206 when an Asynchronous Mode signal is present on line 203. The resulting locally synchronized signal on line 207 indicates the memory access request to the state machine controller 208 so that it may perform the internal operations of the memory enabling response to the request.

The mode signals on lines 203 and 204 can be generated by any suitable means. The circuit of FIG. 7 shows a switch 197 in position for raising the Synchronous Mode signal. Should switch 197 be closed, the Asynchronous Mode signal would be raised through the inverting circuit 205. Alternatively, Asynchronous or Synchronous Mode signals could be generated from a programmable register, from board wiring, from a programmable jumper, from input from system resources, or from any other suitable source.

FIG. 8 is a circuit that generates a Transfer Acknowledge signal upon completion of the internal processing performed by the controller 208. When that processing is complete, the state machine controller 208 raises a response timing signal on line 209. This sets latch 210 and generates a signal on line 211. Line 211 is connected to the multiplexing logic circuit 206A. If a Synchronous Mode signal is present on line 204, the result is the generation of the Transfer Acknowledge signal on line 104.

State machine controller 208 also generates a response timing signal on line 212 upon the completion of its internal operation, i.e., latching the input data in the case of a write command or the placing of data on the data bus in the case of a read command. The signal on line 212 activates latch 213 to generate a signal on line 214 which is presented to the multiplexing logic circuit 206A. If the controller is attached to an asynchronous bus, an Asynchronous Mode signal 203 should be activated thus generating a Transfer Acknowledge signal on line 104.

Figure 9:
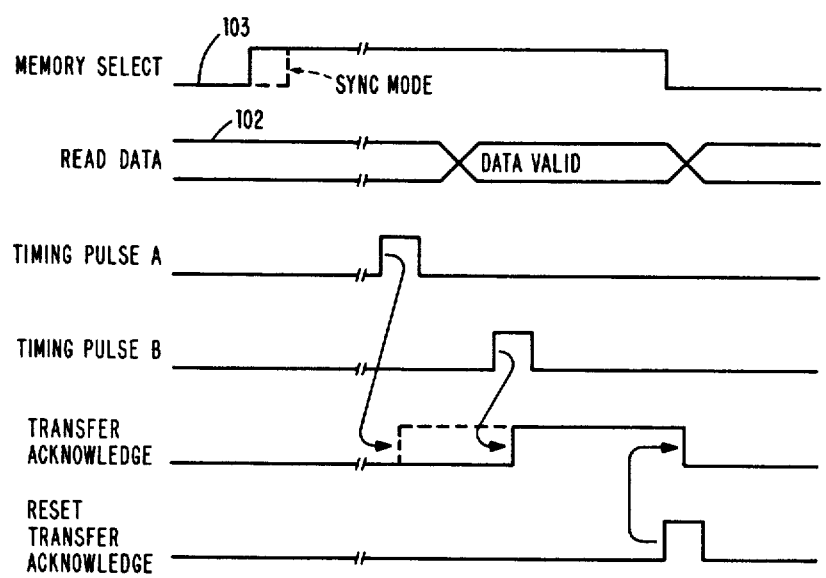
FIG. 9 is a timing chart for the circuits of FIGS. 7 and 8.

FIG. 9 shows the timing of the response signals on lines 209 and 212. Timing Pulse A on line 209 is generated by the state controller just prior to placing data signals 102 on the data bus (for the read data case). Timing Pulse B on line 212 is generated just after the data is placed on the data bus. Since Timing Pulse B generates the Transfer Acknowledge signal through multiplexor circuit 206A for the asynchronous mode, the Transfer Acknowledge signal is raised shortly after Timing Pulse B. In that manner, the asynchronous protocol is satisfied in that the Transfer Acknowledge signal is raised to indicate valid data on the data bus.

For the synchronous case, Timing Pulse A is raised just before data is placed on the data bus. The result is to raise the Transfer Acknowledge signal just prior to data being placed on the bus, that is, one-half clock cycle prior to that data. As previously explained, for the synchronous case, the receiving bus master will sample the data bus one-half cycle after it receives the Transfer Acknowledge signal. When the Memory Select signal 103 is deactivated, the Reset Transfer Acknowledge signal on line 215 (FIG. 8) is activated by the state machine controller 208. That signal resets latches 210 and 213 thereby deactivating the Transfer Acknowledge signal. This event occurs simultaneously for either the synchronous or asynchronous mode.

Figure 7A:
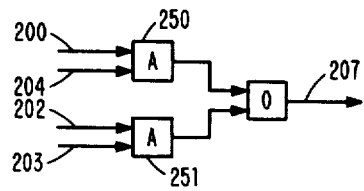
Figure 8A:
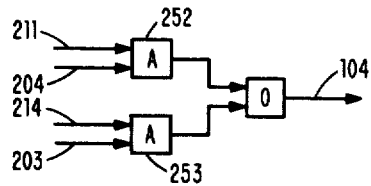

FIGS. 7A and 8A show the simple logic required for multiplexing circuits 206 and 206A. FIG. 7A shows that the Memory Request signal on line 200 is combined with the Synchronous Mode signal on line 204 by AND circuit 250 to generate a signal on line 207. Similarly, a signal on line 202 is combined with the Asynchronous Mode signal on line 203 by AND circuit 251 to generate a signal on line 207.

In FIG. 8A, a signal on line 211 is combined with the Synchronous Mode signal on line 204 by AND circuit 252 to generate a Transfer Acknowledge signal on line 104. Similarly, a signal on line 214 is combined with the Asynchronous Mode signal on line 203 by AND circuit 253 to generate the Transfer Acknowledge signal on line 104.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An interface circuit for connecting a bus system with memory controller means to supply a memory access request signal from said bus system to said memory controller means, said controller means for carrying out internal memory operations in accordance with said memory access request signal and for generating a response signal when those operations are complete, said interface circuit connected to receive said response signal and for supplying said response signal to said bus system, said interface circuit connected to either a synchronous bus system or an asynchronous bus system, said interface circuit comprising:
    switch means for supplying a signal indicative of the type of bus system to which said interface circuit is connected, for passing a synchronous mode signal if synchronous type is indicated and for passing an asynchronous mode signal if asynchronous type is indicated;
    receiving means for receiving said memory access request signal from said bus system;
    synchronizing means connected to receive said memory access request signal from said receiving means and for synchronizing said memory access request signal with the timing of said controller means; and
    logic circuit means connected between said synchronizing means and said controller means and also connected to said switch means for receiving the synchronous and asynchronous mode signals from said switch means and for passing said memory access request signal to said controller means.

2. The interface circuit of claim 1 further including:
    second logic circuit means for generating a transfer acknowledge signal; and
    second receiving means for receiving a response signal from said controller upon completion of memory internal operation and for passing said response signal to said second logic means for the generation of said transfer acknowledge signal.

3. The interface circuit of claim 2 wherein said second logic circuit means is connected to receive said synchronous and asynchronous mode signals and wherein said second receiving means is comprised of:
    first response means for receiving said response signal from said controller means and passing said response signal to said second logic circuit means for generating said transfer acknowledge signal when said synchronous mode signal is present; and
    second response means for receiving said response signal from said controller means and passing said response signal to said second logic circuit means for generating said transfer acknowledge signal when said asynchronous mode signal is present.

4. The interface circuit of claim 1 wherein said logic circuit means is also connected directly between said receiving means and said controller means for passing said memory access request signal directly to said controller means when said synchronous mode signal is present.

5. The method of connecting memory circuits to either a synchronous bus or an asynchronous bus through a common interface circuit for receiving memory access request signals and responding with an acknowledge signal, comprising:
    setting a switch means in said interface circuit to generate a synchronous mode signal if said memory circuits are connected to a synchronous bus and to generate an asynchronous mode signal if said memory circuits are connected to an asynchronous bus;
    receiving said memory access request signal in a decoder circuit from said synchronous bus or from said asynchronous bus whichever type signal is presented; and
    passing said memory access request signal to logic means and then to a state machine controller for performance of internal memory operation in accordance with said memory access request signal and in accordance with a read/write command signal, said passing step including a synchronizing step if in asynchronous mode to synchronize said memory access request signal to a local memory clock signal, and not including said synchronizing step if in synchronous mode.

6. The method of claim 5 wherein said interface circuit also provides common circuit means for interfacing said memory circuits with either a synchronous bus or an asynchronous bus, said common circuit means for generating an acknowledgement signal to said memory access request signal upon completion of internal memory operation in accordance with said memory access request signal and in accordance with a read/write command signal, said method further including the steps of:
    receiving a first response signal from said state machine controller;
    passing said first response signal to second logic means for generating said acknowledgement signal when connected to a synchronous bus;
    receiving a second response signal from said state machine controller; and
    passing said second response signal to said second logic means for generating said acknowledgement signal when connected to an asynchronous bus.

* * * * *